A. E. SPARROW.
TUBE MILL CEMENT FEEDER.
APPLICATION FILED JAN. 20, 1909.
938,176.
Patented Oct. 26, 1909.
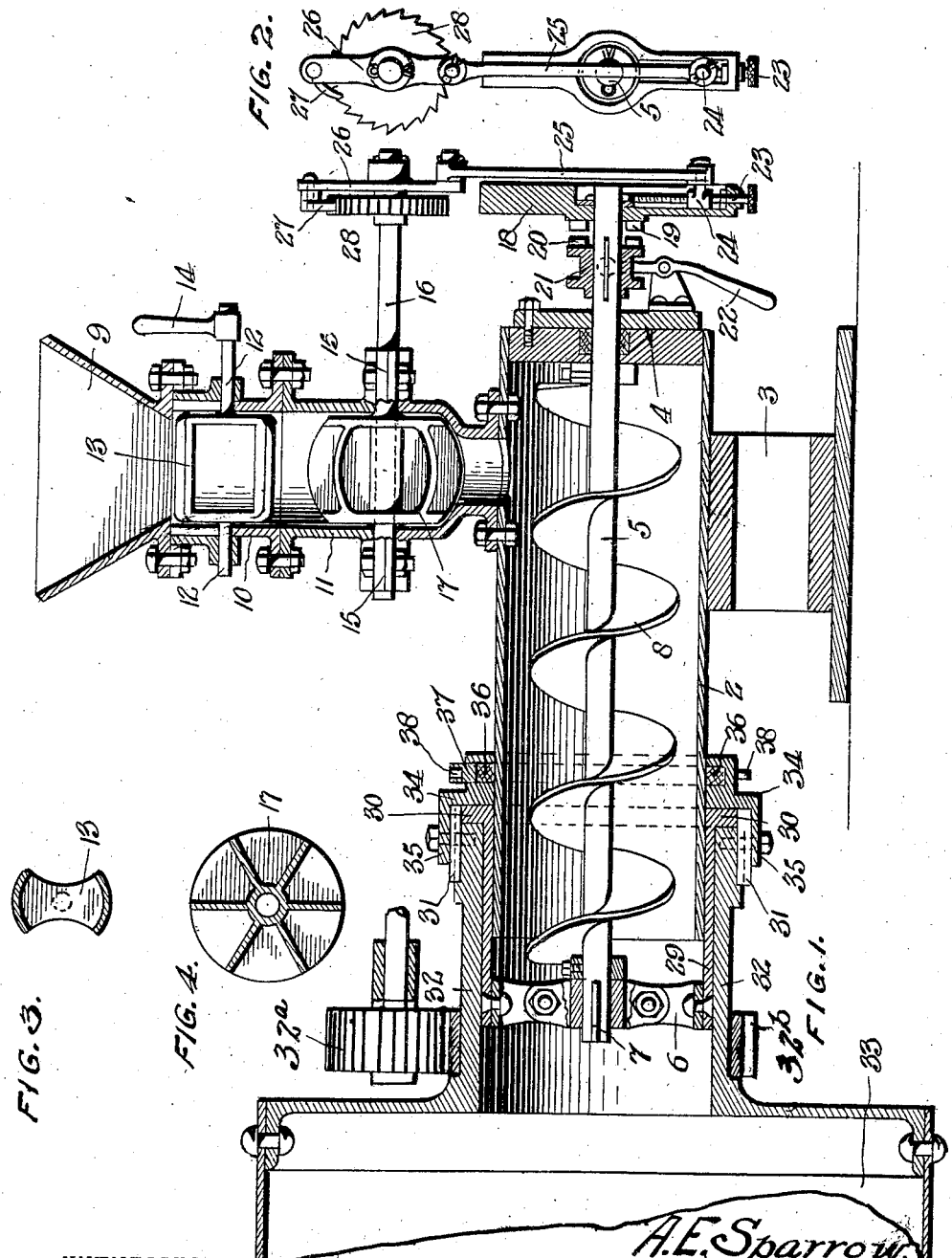

UNITED STATES PATENT OFFICE.

ARTHUR E. SPARROW, OF CHICAGO, ILLINOIS.

TUBE-MILL CEMENT-FEEDER.

938,176.　　　Specification of Letters Patent.　　Patented Oct. 26, 1909.

Application filed January 20, 1909. Serial No. 473,297.

*To all whom it may concern:*

Be it known that I, ARTHUR E. SPARROW, citizen of the United States, residing at Chicago, in the county of Cook and State of Illinois, have invented certain new and useful Improvements in Tube-Mill Cement-Feeders, of which the following is a specification.

My invention relates to tube mill cement feeders, and the object thereof is to provide a simple and inexpensive construction, in which the parts may be readily repaired and cleaned.

Further objects and advantages of my invention will appear in the course of the following description, in which reference is made to the accompanying drawing, forming a part of this specification, in which like numerals are used to designate like parts throughout the several figures, and in which.

Figure 1 is a vertical longitudinal sectional view, taken through my improved apparatus. Fig. 2 is an elevation of the transmission mechanism extending between the main conveyer shaft, and the feed valve shaft. Fig. 3 is a cross section through the regulating valve, and, Fig. 4 is a similar view through the feed valve.

In the practical embodiment of my invention, I provide a conveyer cylinder 2, rigidly supported by a saddle stand 3, and having its rear end closed by means of a circular end plate 4, provided with a central bearing through which readwardly projects a rotatable shaft 5, extending longitudinally of said conveyer cylinder 2, and centrally thereof, and supported at its forward end, by a split spider-bearing 6, within which it is keyed by a key 7, allowing the material from said cylinder 2, to be fed therethrough, by means of a screw-conveyer 8, formed upon the shaft 5.

Adjacent its rear end, the apparatus is provided with a flaring receiving mouth or hopper 9, having communication with the cylinder 2, through an opening thereof, and through co-extensive tubes 10 and 11, extending between the said hopper and said cylinder 2, the upper tube 10, being provided with bearings through which extend trunnions 12, formed upon the ends of a rotatable regulating valve 13, having an operating handle 14 secured to the end of one of its trunnions 12, whereby the same may be rotated to control the amount of feed from hopper 9 to the cylinder 2. The lower tube 11, is formed in two parts, connected together in such manner as to form bearings 15 for a transverse shaft 16, projecting rearwardly of the apparatus, parallel with the projecting end of the conveyer shaft 5, which shaft 16, is provided within said tube 11, with a rotatable feed valve 17.

Upon its rearwardly projecting end, the shaft 5 is provided with a crank head 18, loosely rotatable thereon, and provided with a rear clutch face 19, adapted for engagement by the clutch face 20, carried by a longitudinally movable clutch-sleeve 21 splined upon said shaft 5, and movable by means of an operating handle 22, pivotally mounted upon the end plate 4 of the cylinder 2, in order to clutch said crank head 18, with said shaft 5, and drive the same thereby. In its opposite face, the crank head 18 is provided with a radial rotatable screw bar 23, operating through a crank nut 24, which is connected, by means of a pitman 25, to a crank arm 26, loosely mounted upon the end of the feed valve shaft 16, which latter crank arm 26, is provided at one end, with a pawl 27, for engagement within the peripheral notches of a ratchet wheel 28, secured upon said shaft 16. Thus, rotatable movement of the crank head 18, causes intermittent rotation of the feed valve shaft 16, through the connections described, which movement may be regulated by the regulation of the length of the stroke of the pitman 25, by rotation of the screw bar 23, to move the crank nut 24, radially of, and inwardly or outwardly from, the shaft 5.

The split bearing 6, within which the forward end of the conveyer shaft 5 is keyed, is secured at the ends thereof, within the forward end of a tubular sleeve 29, surrounding the forward end of the conveyer cylinder 2, and provided at its rear end with a circular outstanding flange 30, keyed by one or more keys 31, to the rear end of the neck portion 32, which in turn surrounds said tubular sleeve 29. The tube-mill 33 is supported at its forward end upon suitable rotatable bearings, (not shown), as is usual. Rotation is imparted to the mill-casing 33, by means of a suitably mounted and driven pinion 32$^a$, arranged to engage a strip provided with teeth 32$^b$ secured to the reduced extension 32. A collar 34 surrounds the conveyer cylinder 2, rearwardly of the rear end of the tubular sleeve 29, and is provided with a flanged portion 35, surrounding a portion of said tube 29 and the discharge neck 32. Thus, the collar 34 rotates with the discharge neck 32, and the tube 29, and is provided with a circular packing strip 36, bearing upon the external surface of the cylinder 2, and with openings through its wall communicating with said packing strip, in which openings are disposed blocks 37, having channeled outer faces, in which a circular spring 38 engages, said spring extending entirely around said collar 34.

From the above description, it will be apparent that power from a suitable source, may be transmitted to the conveyer shaft 5, from the neck 32, by means of the spider 6 attached to the tubular sleeve 29, having the flange 30 keyed to said neck 32. It will also be seen that just prior to the complete discharge of a desired quantity of material, the clutch sleeve 21 is moved to the unclutched position, stopping the movement of the valve 17, and discontinuing the feed to the conveyer cylinder 2. In this case however, the conveyer is still rotated until the material is entirely discharged from the cylinder 2.

Having fully described my invention, I claim:

1. In a device of the character described, the combination with a rotatable mill-casing provided with a reduced extension, of a stationary conveyer cylinder extending within said reduced extension, a rotatable conveyer extending longitudinally within said conveyer cylinder, a tubular sleeve arranged within said reduced extension, said tubular sleeve encircling a portion of said conveyer cylinder and extending therebeyond within said reduced extension, means for locking said sleeve to said reduced extension and said rotatable conveyer, substantially as described.

2. In a device of the character described, the combination with a rotatable mill-casing provided with a reduced extension, of a stationary conveyer cylinder extending within said reduced extension, a rotatable conveyer extending longitudinally within said conveyer cylinder, means for connecting said rotatable conveyer, with said reduced extension, said means comprising a tubular sleeve provided with a flange, said tubular sleeve being arranged between said conveyer cylinder and said reduced extension, said tubular sleeve being rigidly connected to said rotatable conveyer and means for locking said flange of said sleeve to said reduced extension, substantially as described.

3. In a device of the character described, the combination with a rotatable mill-casing provided with a reduced extension, of a stationary conveyer cylinder extending within said reduced extension, a rotatable conveyer extending longitudinally within said conveyer cylinder, means for connecting said rotatable conveyer with said reduced extension, said means comprising a tubular sleeve provided with a flanged portion, said tubular sleeve being rigidly connected to said conveyer, means for locking the flanged portion of said sleeve to said reduced extension, an outer sleeve surrounding a portion of said conveyer cylinder and said reduced extension, and means for locking said outer sleeve to said reduced extension, substantially as described.

4. In a device of the character described, the combination with a rotatable mill-casing provided with a reduced extension, of a stationary conveyer cylinder extending within said reduced extension, a tubular sleeve having a flanged portion arranged between said reduced extension and said conveyer cylinder, means for locking the flanged portion of said tubular sleeve to said reduced extension, a rotatable conveyer shaft arranged longitudinally within said conveyer cylinder, said conveyer shaft being rigidly connected with said sleeve and extending forwardly beyond said conveyer cylinder, a hopper provided with a rotatable feed valve arranged upon the forward portion of said conveyer cylinder, means for rotating said feed valve, said means comprising a rotary member mounted upon said conveyer shaft, a ratchet mechanism associated with said feed valve, and an adjustable arm connecting said rotary member and said ratchet mechanism, substantially as described.

5. In a device of the character described, the combination with a rotatable mill casing provided with a reduced extension, of a stationary conveyer cylinder extending within said reduced extension, a tubular sleeve having a flanged portion arranged between said reduced extension and said conveyer cylinder, means for locking the flanged portion of said tubular sleeve to said reduced extension, a rotatable conveyer shaft arranged longitudinally within said conveyer cylinder, said conveyer shaft being rigidly connected with said sleeve and extending forwardly beyond said conveyer cylinder, a hopper provided with a rotatable feed valve arranged upon the forward portion of said conveyer cylinder, means for rotating said feed valve, said means comprising a rotary member revolubly mounted upon said conveyer shaft, a clutch mechanism for locking said rotary member to said shaft, a ratchet mechanism associated with said feed valve, and an adjustable arm connecting said rotary member and said ratchet mechanism, substantially as described.

In testimony whereof I affix my signature in presence of two witnesses.

ARTHUR E. SPARROW.

Witnesses:
OSCAR WEDDLE,
ALEXANDER R. MELVILLE.